Aug. 26, 1958 L. C. WATERMAN 2,849,394
ROTATING ELECTRODE EMULSION COALESCER
Filed June 22, 1953 2 Sheets-Sheet 1

INVENTOR:
LOGAN C. WATERMAN
BY HIS ATTORNEYS
HARRIS, KIECH, FOSTER & HARRIS

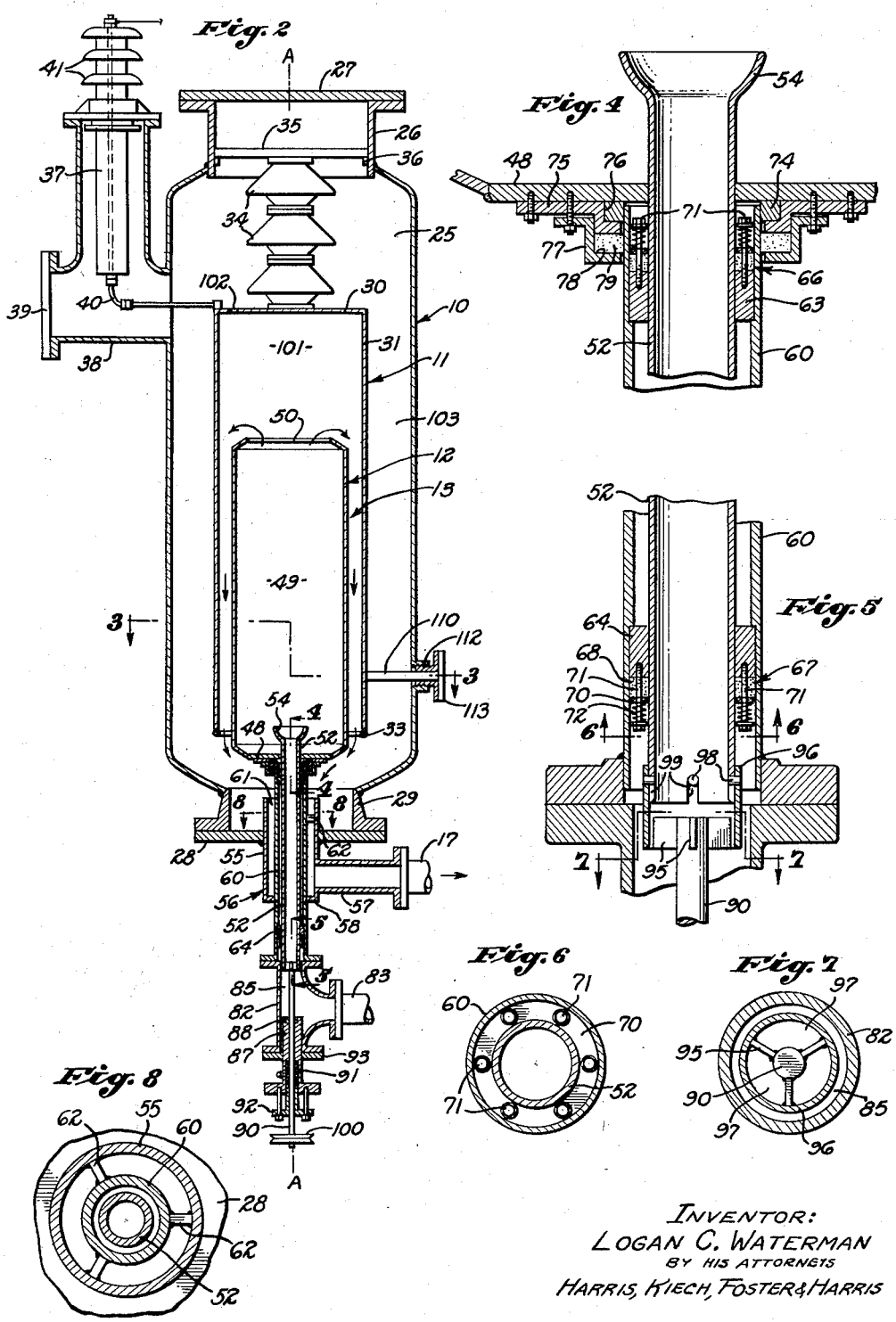

United States Patent Office 2,849,394
Patented Aug. 26, 1958

2,849,394

ROTATING ELECTRODE EMULSION COALESCER

Logan C. Waterman, Houston, Tex., assignor to Petrolite Corporation, Wilmington, Del., a corporation of Delaware Application June 22, 1953, Serial No. 363,349

16 Claims. (Cl. 204—304)

This invention relates to a rotary coalescer for emulsions of the oil-continuous type operating in accordance with elsewhere-invented processes set forth, for example, in the co-pending application of Charles M. Blair, Jr., et al., Serial No. 345,472, filed on or about March 30, 1953, now abandoned, the process disclosures of said application being herein incorporated by this reference. More particularly, the invention relates to a novel electrical or non-electrical rotary coalescer for emulsions and to a structure by which an emulsion can be subjected to a controlled turbulence of the coalescing type during passage through a treating space; also to an apparatus in which an electric field can be established in the treating space to aid in the resolution of the emulsion.

The processes mentioned above are based on the discovery that a properly controlled turbulence, induced by relative rotation of the bounding surfaces of an annular treating space through which the emulsion flows, can be used to effect coalescence of dispersed-phase droplets of an emulsion. The turbulence cannot be promiscuous and is preferably a relatively mild turbulence within predetermined limits effected by relative rotation of two smooth cylindrical surfaces between which the emulsion flows.

The processes of the application, supra, are also based on the discovery that emulsion resolution can be aided by use of such turbulence in an electric field. While it was earlier suggested that short circuiting paths or "chains" through the emulsion bridging two electrodes could be broken up by rotating one of the electrodes, the earlier proposals were designed to produce a high degree of turbulence, usually transiently localized, as by sweeping projections or paddle-like structures through the emulsion. The resulting promiscuous turbulence was not of a coalescing character and often tended to redisperse electrically-coalesced masses. In the improved process of the application, supra, it was found that a controlled turbulence could be used to bring spaced droplets of the emulsion transiently closer together. As the electrical attractive force between two spaced droplets in a field varies with the size of the droplets and inversely as about the fourth power of the distance therebetween, droplets which are too small or too widely spaced can escape such electrical attractive force as will bring them together and coalesce them. With the new process, however, the attractive forces between the droplets, induced by the electric field, can induce coalescence when the controlled turbulence brings these droplets transiently closer together.

It is an object of the present invention to provide a rotary coalescer of novel construction and with many novel features, coactions and arrangements, adapted to perform such processes.

It is an object of the present invention to provide a rotary coalescer having nested cylindrical members and to mount one of these for rotation relative to the other or others. A further object is to mount one of such cylindrical members for rotation by attaching to one end thereof a single support or drive member. A further object is to provide two positioning means attached respectively to the ends of two cylindrical members and extending respectively beyond the opposite ends of an annular treating space between the two cylindrical members.

A further object of the invention is to provide a rotary coalescer in which the rotating cylindrical member is disposed in a housing and in which the influent and effluent emulsion enters and leaves the housing at the same end thereof. A further object is to provide a novel circulation means useful in this connection.

An important object of the invention is to provide a rotary coalescer in which the inner and/or outer cylindrical members can be readily removed from the housing; also to provide a rotary coalescer which is simple and economical to manufacture, yet which can be used to produce excellent emulsion resolution.

Further objects and advantages will be apparent to those skilled in the art from the following description of an exemplary embodiment.

Referring to the drawings:

Figs. 4 and 5 are respectively enlarged fragmentary vertical sectional views taken along the corresponding lines of Fig. 2;

Figs. 6 and 7 are horizontal sectional views taken along corresponding lines of Fig. 5;

Fig. 8 is a horizontal sectional view taken along the line 8—8 of Fig. 2; and

Fig. 9 is a sectional view of an alternative embodiment of the invention.

Figure 1:
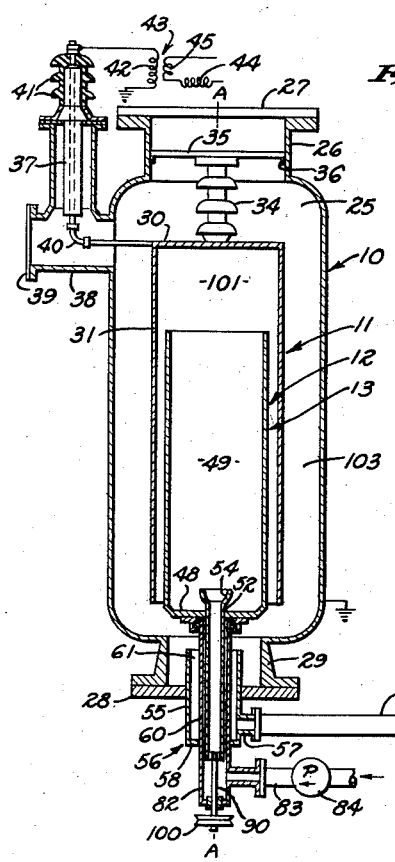
Fig. 1 illustrates a simplified embodiment of the invention associated with a settling tank.
Figure 2:
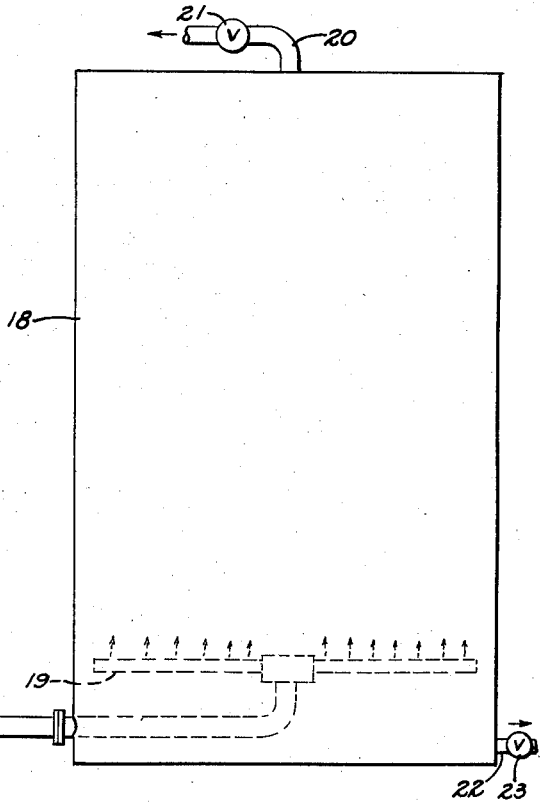
Fig. 2 is a vertical sectional view of the preferred embodiment of the invention.
Figure 2:
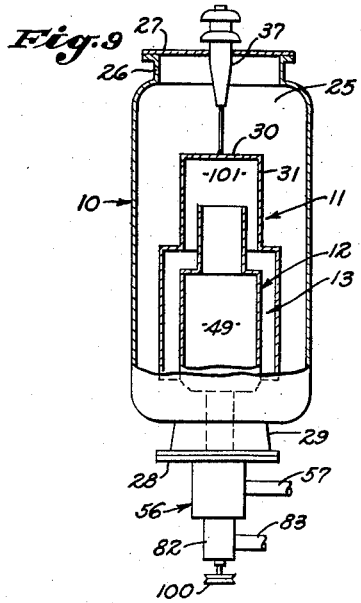

Referring particularly to Figs. 1 and 2, the invention includes generally a housing 10 enclosing an outer cylindrical member 11 and an inner cylindrical member 12 positioned therein, these members being nested to provide therebetween an annular treating space 13. Such members and the annular treating space therebetween are preferably concentric with the vertical axis A—A of the housing 10. One of the cylindrical members, preferably the inner one, is mounted to turn relative to the other and about the common axis of both. A stream of the emulsion to be treated is circulated through the annular treating space 13 from end to end by means of a suitable circulation means. The effluent emulsion or the treated emulsion constituents discharge through a pipe 17 into a settling tank 18, being discharged therein by a perforated distributor 19. The treated emulsion constituents separate in the tank 18, the treated oil or continuous-phase material discharging from the upper end of the tank through a pipe 20 providing a throttling valve 21, the separated aqueous or dispersed-phase material discharging from the lower end of the tank 18 through a pipe 22 equipped with a throttling valve 23.

The housing 10 is preferably a pressure vessel completely closed at its upper end to form a fluid-entrapment space 25. This is accomplished by use of a flanged collar 26 to which is removably secured by bolts, not shown, a cover means comprising a cover 27. It is preferred that the collar 26 be of such internal diameter as to permit removal of the outer cylindrical member 11 therethrough.

The lower end of the housing 10 is preferably provided with a removable closure, shown as a closure plate 28 secured by bolts, not shown, to a flanged collar 29 forming a part of the housing 10. It is preferred that the diameter of the flanged collar 29 be sufficiently large to permit passage of the inner cylindrical member 12.

Each of the inner and outer cylindrical members 11 and 12 is attached to and positioned by a positioning means. It is preferred that these positioning means should extend in opposite directions relative to the axis A—A and that they should be beyond respective ends of the treating space 13. These positioning means can best be described along with the construction of the cylindrical members, as follows:

The outer cylindrical member 11 is in the form of an inverted cup-like member or electrode closed at its upper end, except for a small "weep" hole for escape of gas as will be described. This cup-like member includes an upper wall 30 from which depends a cylindrical skirt 31. This skirt may be formed of sheet metal and the lower end thereof may provide an annular bead 33 rolled from the sheet metal or welded to the lower end thereof. This bead may serve as a reinforcing means and/or as a means for avoiding a sharp edge at the lower end of the skirt and the resultant excessively high electrical stresses that might otherwise appear there when the skirt is energized.

The positioning means for the outer cylindrical member 11 is shown as a string of suspending insulators 34 comprising a means for insulating this cylindrical member from the housing 10 and from the inner cylindrical member. The insulators 34 form an insulation means supported from a removable cross-bar 35 secured removably in place by means not shown and resting on shoulders 36 of the collar 26. A high-voltage bushing 37 is mounted in the upright leg of a T-shaped fitting 38 secured to and opening on the interior of the housing 10, one side of this fitting being closed by a plate 39. A conductor 40 traverses the bushing and is electrically connected to the outer cylindrical member 11. The upper portion of the bushing 37 may be surrounded by a porcelain cap 41, see Figs. 1 and 2, the upper end of the conductor 40 being connected to a high-voltage terminal of a secondary winding 42 of a high-voltage transformer 43. A choke coil 44 is connected in series with a primary winding 45 of the transformer. The remaining terminal of the secondary winding 42 is connected to the housing 10 through ground, as shown. While the bushing and the insulators 34 are shown as separate elements, the functions thereof can be combined by using the bushing to support the outer cylindrical member 11, as suggested in Fig. 9, thereby utilizing the bushing for the dual purpose of support and energization.

The inner cylindrical member 12 in the illustrated embodiments is mounted to turn relative to the outer cylindrical member 11. It can be made of sheet metal or can be of thicker construction if desired. It includes an end wall 48 at its lower end and provides an upright passage 49 terminating in an inturned flange 50 which is desirable from electric, mechanical and hydraulic standpoints. Electrically, should any large droplet of water flow from the open upper end of the cylindrical member 12, such droplet will not immediately enter an electric field of as high a gradient as if the flange 50 were not present. Also, if a plurality of such large droplets are thus discharged, they will be required to bridge a greater interelectrode distance before causing short-circuiting.

The positioning means for the inner cylindrical member 12 includes an inner tubular member 52 coaxial with the housing and with both cylindrical members 11 and 12. The upper end of the tubular member 52 opens on the lower portion of the passage 49 and is shown as including a cup-like or flared discharge member 54 positioned in the interior of the inner cylindrical member 12 a distance above the end wall 48.

It is desirable that the inner cylindrical member 12 be supported and positioned solely at one end and that this be accomplished by attachment to the tubular member 52. It is also desirable that this tubular member be journaled by spaced bearings to prevent substantial vibration of sidewise movement. At the same time, it is desirable that the bearing means be sealed from the emulsion. These functions, as well as those of conducting fluid to and from the interior of the coalescer, are performed by the following structure.

Welded or otherwise secured to the closure plate 28 is a conduit 55 forming a part of an outlet fitting 56 connected by a pipe 57 to the pipe 17 by a conventional flange connection. Secured to and extending upwardly through a bottom wall 58 of the outlet fitting 56 is an outer tubular member 60 forming an annular space around the inner tubular member 52. The conduit 55 is spaced from the outer tubular member 60 to define an annular outlet space 61 opening on the lower interior of the housing 10 and communicating with the lower end of the annular treating space 13. To rigidify the upper end of the conduit 55 and the outer tubular member 60, three or more arms 62, best shown in Figs. 2 and 8, bridge the annular outlet space 61. The treated emulsion constituents entering the annular outlet space 61 can flow between the arms 62 while not being subjected to such turbulence as would redisperse the coalesced masses.

The inner tubular member 52 is journaled in bearings 63 and 64 set in counterbored portions of the outer tubular member 60, as best shown in Figs. 4 and 5. To seal the annular space between the tubular members 52 and 60 and also to block movement of the emulsion into the bearings, sealing means 66 and 67 are disposed in the counterbored portions beyond the bearings. Each sealing means may comprise an annular ring 68 of sealing material, such as felt, and is preferably compacted resiliently against the tubular members and the bearing by a ring 70 traversed by bolts 71 threaded into the bearing. The ring 70 slides on these bolts and is urged resiliently into contact with the sealing ring 68 by springs 72 compressed between the heads of the bolts 71 and the ring 70.

The thrust of the inner cylindrical member 12 may be taken by engagement between the upper end of the outer tubular member 60 and the end wall 48, in which event the inner cylindrical member 12 may be removed from the upper end of the housing 10. However, the preferred construction includes a beairng ring 74 brazed or otherwise secured to the upper end of the outer tubular member 60 and presenting an upper surface on which the end wall 48 journals. A flanged ring 75 is bolted to the end wall 48 and provides an annular cavity 76 receiving the bearing 74. Another flanged ring 77 is likewise bolted to the end wall 48 and provides a sealing chamber 78 containing a sealing ring 79 formed of felt or similar material. This sealing material is compressed between the flanged members 75 and 77 and against the outer tubular member 60 when the bolts attaching the ring 77 are tightened, thus forming a seal separating the emulsion in the lower interior of the housing from the bearing 74.

In the preferred practice of the invention, the inner tubular member 52 serves not only as the support for the inner cylindrical member 12 but also as a means for conducting the incoming emulsion to the passage 49. To accomplish this result, the lower end of the outer tubular member 60 is flanged and connected to a T-shaped inlet fitting 82, the side leg of which is connected, by a flanged connection, to an emulsion inlet pipe 83 to which the emulsion is supplied under presure by a pump 84 (Fig. 1). Extending into an internal zone 85 of the fitting 82 is a bearing tube 87 carrying a bearing 88 in an upper counterbore. A shaft 90 is journaled in the bearing 88 and is sealed by a packing 91 disposed in a lower counterbore of the bearing tube 87 and compressed by a conventional gland 92. The bearing tube 87 carries a flange 93 which is removably connected to a flange of the fitting 82.

The uppermost end of the shaft 90 is detachably connected in driving relationship with the inner tubular member 52 by a passaged connection means, best shown in Fig. 5. To the upper end of the shaft 90 is secured a plurality of spaced arms 95 with their outer ends secured to a sleeve member 96. Between the arms 95 are fluid-conducting passages 97, best shown in Fig. 7, which interconnect the internal zone 85 of the fitting 82 with the interior of the inner tubular member 52. The sleeve member 96 telescopes with the lower end of the inner tubular member 52 and provides inwardly extending pins 98 slidably received by slots 99 opening on the lowermost end of the inner tubular member 52. In this way the shaft 90 and the inner tubular member 52 can be axially separated but, when interconnected, are locked against relative rotation.

Any suitable drive means is utilized to turn the shaft 90, the inner tubular member 52 and the inner cylindrical member 12. This drive means is shown as including a pulley 100 secured to the shaft 90 and which may be connected by a suitable belt to an electric motor or other driving unit which may turn at a variable or a predetermined speed.

The controlled turbulence is established in the annular treating space 13 during longitudinal movement of the emulsion therethrough and while the entire housing 10 is filled with fluid. In the preferred practice of the invention, the controlled turbulence is created by rotating the inner cylindrical member 12 relative to the outer cylindrical member 11, although either or both cylindrical members can be rotatably mounted if desired. The outer periphery of the inner cylindrical member 12 and the inner periphery of the outer cylindrical member 11 are preferably smooth cylindrical surfaces spaced from each other a distance which may vary from a fraction of an inch up to several inches. With the annular treating space 13 filled with emulsion and with the inner cylindrical member rotating, there will be established in the treating space 13 a turbulence which is substantially uniform from position to position. There will be a slippage between adjacent laminae with no more than mild currents transverse to the adjacent laminae. Thus, dispersed droplets in adjacent or nearby laminae will be brought into coalescing contact or into such adjacency that an electric field established in the treating space 13 will electrically attract and coalesce such droplets. At the same time, the mild controlled turbulence in the treating space 13 prevents any substantial redispersion of the coalesced masses whereby such coalesced masses reach the settling tank 18 in such condition that they can readily separate from the oil. In this connection it is desirable that the pipe 17 be short and relatively large so that the treated emulsion constituents move from the interior of the housing 10 to the settling tank 18 without being subjected to such turbulence as would redisperse the coalesced masses.

While either of the fittings 56 or 82 can be used as the inlet fitting, the other being the discharge fitting, it is distinctly preferable to discharge the emulsion into the fitting 82 and withdraw the treated emulsion constituents from the fitting 56. With this mode of operation, the pressured emulsion stream rises through the passages 97 and flows longitudinally through the inner tubular member 52, discharging therefrom into the lower end of the passage 49. Here its upward velocity is reduced and the emulsion flows smoothly and uniformly into a zone 101 in the upper interior of the outer cylindrical member 11. From this zone the emulsion is evenly distributed to all peripheral portions of the upper end of the annular treating space 13. The emulsion flows downwardly in the treating space 13 with substantially equal downward components of velocity in all peripheral portions of this space.

While the emulsion is in the annular treating space, it is subjected to the aforesaid controlled turbulence and, if desired, to a supplementary electrically-induced coalescing action. The latter is the result of a high-voltage electric field in the treating space induced by maintaining a high-voltage potential difference between the inner and outer cylindrical members 11 and 12.

The treated emulsion constituents discharge from the lower end of the annular treating space 13 into the lower interior of the housing 10, flowing toward the central axis A—A of the housing into the annular outlet space 61. This central withdrawal from the lower end of the housing promotes equal distribution and flow through all peripheral portions of the annular treating space. In addition, the short distance from the lower end of the annular treating space 13 to the annular outlet space 61 insures that little, if any, separation of the treated constituents can occur, permitting the separation to take place outside the housing 10, which is desirable. From the annular outlet space 61 the treated emulsion constituents discharge through the pipe 57 and flow to the settling tank 18 for prompt gravitational separation. If desired, the valves 21 and 23 may throttle the separated constitutents to maintain a superatmospheric pressure in the housing 10.

In some instances it may be desirable to form one or more small weep holes 102 in the upper wall 30 to permit escape of any gas that might be liberated in the zone 101.

The hereinbefore described embodiment of the invention is simple to construct and is very versatile not only in permitting adjustment of rate of rotation but also in permitting change in width of the treating space 13. In this latter connection, the outer cylindrical member 11 can be removed from the top of the treater and replaced with a member of different diameter. Similarly, the inner cylindrical member 12 can be withdrawn from the lower end of the housing, or sometimes from the upper end thereof, for inspection or change in size. While the invention can be employed without the outer cylindrical member 11, the annular treating space being then between the inner cylindrical member 12 and the housing 10, it is distinctly preferred to employ the arrangement shown.

The housing may be initially filled with dry oil introduced through the pipe 83, air being bled from the upper end of the housing, by means not shown, to permit complete filling thereof. A body of this dry oil will remain entrapped in the fluid-entrapment space 25, of which an annular zone 103 between the outer cylindrical member 11 and the housing is a part, during the time that emulsion later flows through the unit, with no substantial intermixture of the emulsion and dry oil. This dry oil protects the insulators 34 and the bushing 37 from contamination. In addition, this body of quiescent dry oil in the annular zone 103 has a damping action tending to stabilize the outer cylindrical member 11 against vibration or disalignment by the forces set up as a result of the rotation of the inner cylindrical member 12 or its drive means.

Vertical axial disposition of the outer cylindrical member 11 is desirable in keeping the dispersed-phase material of the emulsion from entering the fluid-entrapment space 25 and in preventing gravitational displacement of the outer cylindrical member from coaxial position relative to the inner cylindrical member. Even with such vertical axial disposition, however, conditions of high throughput and high rotation of the inner cylindrical member may establish forces tending toward lateral displacement of the outer cylindrical member. For example, if the velocity in one side of the annular treating space 13 should temporarily exceed that in an opposed side for any reason, there would be a corresponding reduction in pressure in the former and the pressure of the static body in the fluid-entrapment space 25 would tend to displace the outer cylindrical member in a direction tending further to increase the velocity in said one side of the annular treating space 13. In this sense, the outer cylindrical member may become hydraulically unstable not as against vibration but as against slowly changing differences in pressure resulting from hydraulic flow. Correspondingly, the aforesaid suspension or positioning means for the outer cylindrical member should desirably be quite rigid and/or a supplemental centering means should desirably be used.

Figure 3:
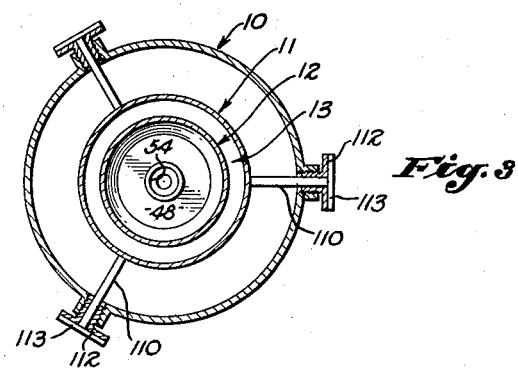
Fig. 3 is a horizontal sectional view taken along the line 3—3 of Fig. 2.

Such a supplemental centering means is shown in Figs. 2 and 3 as comprising three structures equally spaced about the axis A—A, comprising three insulators engaging the outer cylindrical member 11 and restraining it against lateral displacement. Each insulator is desirably a rod 110 of insulating material, preferably polytetrafluoroethylene, trifluorochloroethylene, or similar material, although if a dry oil of relatively high dielectric strength is entrapped in the space 25 other more conventional insulation materials can be used. As shown, each rod 110 extends into a flanged threaded nipple 112 to the flange of which is connected, by bolts not shown, a closure plate 113. Each nipple is threaded into a threaded collar 114 welded or otherwise connected to the housing 10. The outermost end of each rod 110 may engage the closure plate 113 or shims between such end and such plate to adjust the radial position of the rod. The innermost end of each rod 110 may merely engage the outer surface of the outer cylindrical member 11 or may be otherwise connected thereto.

As an example of the operation of the invention when employed in the electrical desalting process, a West Texas crude oil containing about 75 p. t. b. of salt was passed through a coalescer of the type hereinbefore described. The diameter of the housing 10 was about 30", the internal diameter of the outer cylindrical member 11 being about 18", the external diameter of the inner cylindrical member 12 being about 14", the width of the annular space 13 being about 2" and the length of this annular space being about 39". In this run, the inner cylindrical member 12 was rotated at a rate of 250 R. P. M., the electrodes being energized from a 13,500 volt transformer. About 5% by volume of fresh water was emulsified with the crude oil by use of an emulsifying valve including a pressure drop of about 40 p. s. i. At a throughput rate of 4,200 barrels per day, the treated and settled desalted oil contained only 3.8 p. t. b. of residual salt.

In a companion run on this oil under the same operating conditions, the emulsion was passed through a conventional electric treater similar to that shown in U. S. Patent No. 2,513,386, energized from a 13,500 volt transformer, the electrodes being spaced about 4.5". Even at a lower throughput of about 4,000 barrels per day, the residual salt content was about 11.3 p. t. b.

While the invention has been described with reference to inner and outer cylindrical members which are of the same diameter throughout the respective nested portions, it is within the scope of the invention that the cylindrical members can be of conical or stepped configuration, as suggested in Fig. 9. With this arrangement the emulsion can be made to flow sequentially through annular treating zones of different diameters or widths. In at least that zone from which the treated emulsion constituents discharge, the turbulence should be of the aforesaid coalescing character if best results are to be obtained.

Various changes can be made without departing from the spirit of the invention as defined in the appended claims.

I claim:

1. A rotary coalescer for emulsions including in combination: a housing; two smooth-surfaced imperforate cylindrical members of different diameter; two end walls respectively closing opposite ends of said two cylindrical members; two positioning means respectively secured to said cylindrical members, one of said positioning means including a tubular member communicating with the interior of its respective cylindrical member through the end wall thereof; spaced supports mounting said positioning means and said cylindrical members within said housing with said cylindrical members disposed one within the other concentric with a common axis, the inner of said cylindrical members being spaced from the outer of said cylindrical members to define therebetween a narrow annular treating space much larger in length parallel to said axis than in width, one of said supports including means for mounting its corresponding cylindrical member to turn relative to the other member about said common axis, said tubular member communicating with the interior of its said respective cylindrical member through a circular discharge orifice coaxial with said common axis; means for flowing a stream of emulsion through said annular treating space from end to end thereof by way of said tubular member and said circular discharge orifice; and means for turning said one of said cylindrical members about said common axis.

2. A rotary coalescer as defined in claim 1 in which said cylindrical members are longitudinally positioned exclusively by the respective positioning means, and in which the positioning means are respectively beyond the end walls at said opposite ends of said annular treating space.

3. A rotary coalescer for emulsions comprising in combination: inner and outer coaxial tubular members, said inner member being within said outer member for a substantial portion of its length to define therebetween a narrow annular treating space much longer in length than in width; circulation means for circulating the emulsion to be treated through said annular treating space from end to end thereof, said circulation means including a pair of concentric pipes exclusively at one end of one of said members, said pipes being spaced from each other to define therebetween concentric inlet and outlet passages respectively communicating with opposite ends of said treating space, one of said passages communicating with its respective end of said treating space through the interior of said inner tubular member, said circulation means including means for guiding the emulsion to flow from said inlet passage into one end of said treating space, thence through said treating space and from the other end thereof into said outlet passage; and means for rotating one of said tubular members relative to the other about the common axis thereof.

4. A rotary coalescer for emulsions comprising in combination: a housing; inner and outer cylindrical members, the outer cylindrical member being closed at one end and the inner cylindrical member providing a longitudinal passage open at one end and closed at the opposite end; means for mounting said cylindrical members coaxially of each other within said housing with said inner cylindrical member nested within said outer cylindrical member throughout substantially the entire length of said inner member to form a nested structure, the closed ends of said cylindrical members being at opposite ends of said nested structure and being spaced from each other along the axis of said cylindrical members, there being an annular treating space of substantial axial length between said members, said treating space having opposed ends, one such end communicating with said open end of said longitudinal passage of said inner cylindrical member; walls at one end of said housing defining inlet and outlet passages respectively connected with said opposed ends of said annular treating space, such connection with said one end of such treating space being through said longitudinal passage of said inner cylindrical member; circulation means for flowing the emulsion to be treated sequentially through said inlet passage, through said treating space from end to end thereof and through said outlet passage; and drive means for rotating one of said members relative to the other about the common axis thereof to establish a controlled turbulence in the emulsion in said annular treating space.

5. A rotary coalescer for emulsions comprising in combination: a housing; inner and outer cylindrical members, the outer cylindrical member being closed at one end and the inner cylindrical member providing a longitudinal passage; means for mounting said cylindrical members coaxially within said housing with said inner cylindrical member nested within said outer closed-ended cylindrical member, said mounting means including an insulator means supporting said outer cylindrical member, there being an annular treating space between said members, said treating space being open at opposed ends, one open end communicating with said longitudinal passage; circulation means for circulating the emulsion to be treated through said annular treating space from end to end, said circulation means including walls at one end of said housing defining inlet and outlet passages respectively communicating with said open ends; drive means for rotating one of said members relative to the other about the common axis thereof to establish a controlled turbulence in the emulsion in said annular treating space; and means for applying to said outer cylindrical member a high-voltage potential, said inner cylindrical member being electrically connected to said housing.

6. A rotary coalescer as defined in claim 5 in which said drive means rotates said inner cylindrical member and in which said outer cylindrical member is stationary.

7. A rotary coalescer for emulsions comprising: an upright cylindrical member; a tubular drive member secured to the lower end of said upright cylindrical member and extending coaxially therefrom, said cylindrical member having a passage extending from end to end thereof, said passage opening at its upper end on a zone above said cylindrical member and communicating at its lower end with the interior of said tubular drive member; bearing means journaling said tubular drive member to turn about its axis, thereby turning said upright cylindrical member about such axis, said upright cylindrical member being supported and positioned solely by said tubular drive member; drive means for turning said tubular drive member and its attached upright cylindrical member; an outer cylindrical member surrounding and concentric with said upright cylindrical member and spaced therefrom to provide an annular treating space having upper and lower ends, the upper end of said annular treating space opening on said zone; and a circulation means for circulating the emulsion to be treated through said annular treating space from end to end thereof, said circulation means including two liquid-conducting means communicating respectively with said lower end of said annular treating space and with the interior of said tubular drive member.

8. A rotary coalescer as defined in claim 7 in which one of said fluid-conducting means includes a conduit concentric with said tubular drive member, the interior of said conduit communicating with said lower end of said annular treating space.

9. A rotary coalescer for emulsions comprising: an upright cylindrical member having an upright passage therethrough; a tubular drive member secured to the lower end of said upright cylindrical member coaxially therewith, the interior of said tubular drive member communicating with the lower end of said upright passage; means for journaling said tubular drive member to turn about the axis of said cylindrical member; an inverted cup-like member having an upper end wall and a depending skirt, said skirt being of larger diameter than said cylindrical member; means for mounting said cup-like member with said upper wall spaced from the top of said cylindrical member to form a zone therebetween and with said skirt surrounding a substantial portion of said upright cylindrical member and defining therearound an annular treating space open at its upper end to said zone, said annular treating space providing a lower end; two liquid-conducting means communicating respectively with the interior of said tubular drive member and with said lower end of said annular treating space; means for flowing a stream of the emulsion to be treated into one of said liquid-conducting means and from the other to establish a stream of emulsion flowing through said annular treating space from end to end thereof; and means for turning said tubular drive member and its attached upright cylindrical member to establish a controlled turbulence in the emulsion in said annular treating space.

10. A rotary coalescer as defined in claim 9 in which said means for mounting said cup-like member is an electrical insulator means, said rotary coalescer including means for establishing a high-voltage electric field in said annular treating space, said last-named means including means for establishing a high-voltage potential difference between said upright cylindrical member and said cup-like member.

11. A rotary coalescer for emulsions comprising: an outer stationary tubular member; an inner rotatable tubular member having a portion rotatably mounted in said outer stationary tubular member to turn therein about the axis thereof; a liquid-conducting fitting secured to said outer stationary tubular member and providing an internal zone; a rotary shaft extending into said internal zone; a passaged connection means operatively connecting said shaft and said inner tubular member, said connection means providing a liquid-conducting passage means interconnecting said internal zone and the interior of said inner tubular member; an inner cylindrical member having one end attached to and supported by said inner tubular member, said inner cylindrical member providing a passage therethrough from end to end interconnecting the interior of said inner tubular member and a zone beyond the other end of said inner cylindrical member; an outer cylindrical member surrounding said inner cylindrical member, there being an annular treating space between such cylindrical members having one end opening on said zone; and drive means for rotating said shaft.

12. A rotary coalescer as defined in claim 11 including means for detachably connecting said shaft and said inner tubular member.

13. A rotary coalescer as defined in claim 11 in which said inner and outer tubular members are spaced from each other to define an annular space therebetween, and including two bearings positioned in and spaced from each other in a direction longitudinally of this annular space for journaling said inner tubular member.

14. A rotary coalescer as defined in claim 13 including at least one annular sealing means in said annular space between said inner and outer tubular members for sealing this annular space against entry of said emulsion.

15. A rotary coalescer for emulsions comprising: an upright housing completely closed at its upper end against egress of fluid; an inverted cup-like member suspended in said housing and providing a cylindrical skirt open at its lower end to the interior of said housing; a removable closure for the lower end of said housing; a conduit attached to said closure, said conduit providing an upper end spaced from the lower end of said cylindrical skirt; an inner cylindrical member nested within and coaxial with said cylindrical skirt and spaced therefrom to define an annular treating space having an upper end opening on a zone in the upper interior of said inverted cup-like member, said inner cylindrical member providing a passage opening at its upper end on said zone; a tubular drive member depending from and supporting said inner cylindrical member, the interior of said tubular drive member communicating with the lower end of said passage of said inner cylindrical member; means for journaling said tubular drive member for rotation thereof and of said inner cylindrical member about the vertical axis of said cylindrical skirt; means for turning said tubular drive member; and means for delivering a stream of emulsion to the interior of said tubular drive member to flow upwardly therethrough, upwardly through said passage of said inner cylindrical member to said zone, downwardly through said annular treating space and from said conduit.

16. A rotary coalescer as defined in claim 15 in which said conduit is coaxial with said cylindrical skirt and in which said tubular drive member extends downward therein, the upper end of said conduit providing an annular passage through which said treated emulsion is withdrawn from the interior of said mounting.

References Cited in the file of this patent

UNITED STATES PATENTS

| | | |
|---|---|---|
| 744,096 | Otto | Nov. 17, 1903 |
| 1,034,668 | Wright | Aug. 6, 1912 |
| 1,382,234 | Quinby | June 21, 1921 |
| 1,430,300 | Harris | Sept. 26, 1922 |
| 1,674,242 | Eddy | June 19, 1928 |
| 1,783,595 | Worthington | Dec. 2, 1930 |
| 2,047,538 | Woelflin | July 14, 1936 |

UNITED STATES PATENT OFFICE
CERTIFICATE OF CORRECTION

Patent No. 2,849,394                                              August 26, 1958

Logan C. Waterman

It is hereby certified that error appears in the printed specification of the above numbered patent requiring correction and that the said Letters Patent should read as corrected below.

Column 4, line 2, for "of sidewise movement" read -- or sidewise movement --; column 7, line 40, for "including" read -- inducing --; column 11, line 9, before "treated" strike out "said"; line 10, for "mounting" read -- housing --.

Signed and sealed this 11th day of November 1958.

(SEAL)

Attest:
KARL H. AXLINE
Attesting Officer

ROBERT C. WATSON
Commissioner of Patents